G. W. DAY.
TRACTOR.
APPLICATION FILED FEB. 6, 1912.
1,126,960.
Patented Feb. 2, 1915.
3 SHEETS—SHEET 3.
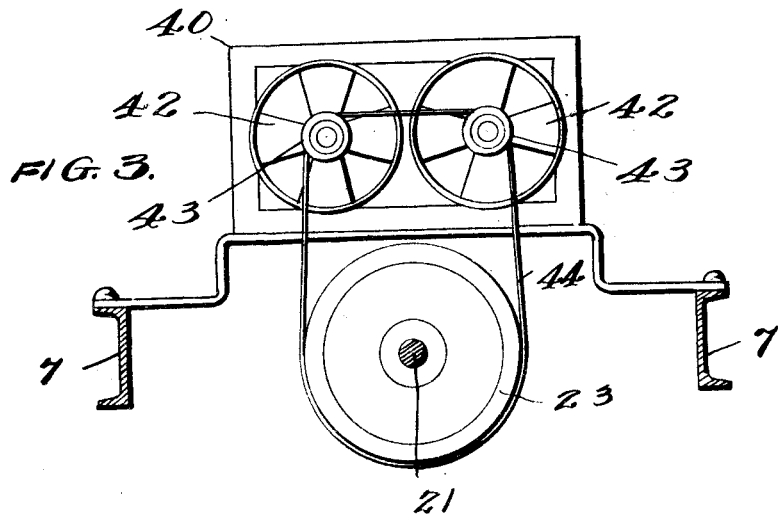
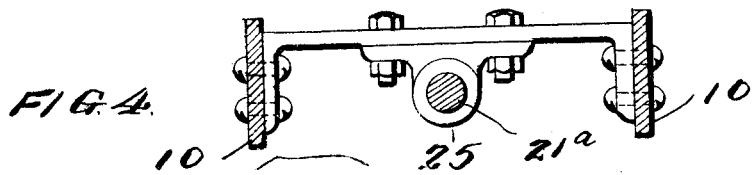
WITNESSES
M. Reimer
M. Hamilton.
INVENTOR
George W. Day
By James Hamilton
Attorney

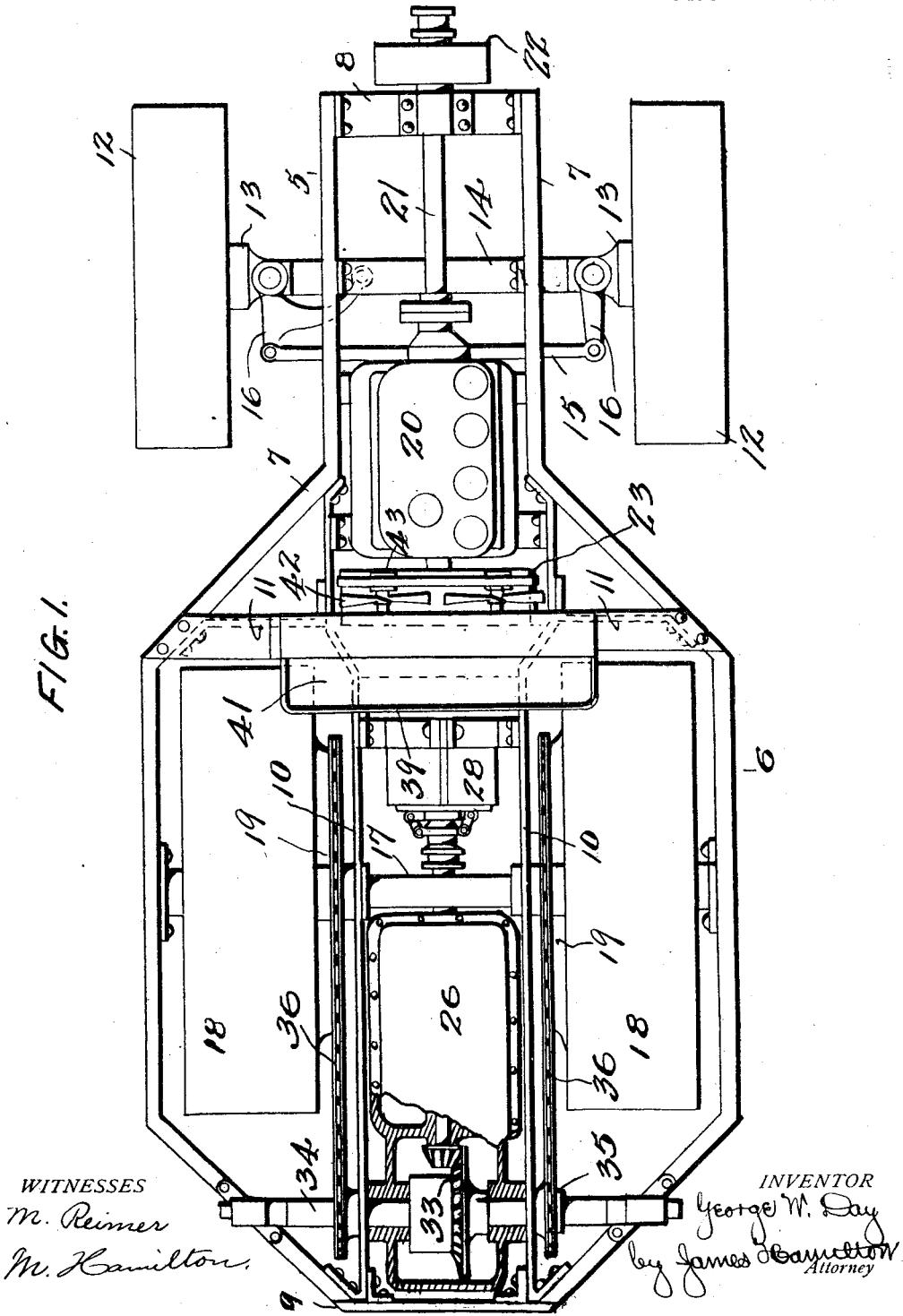

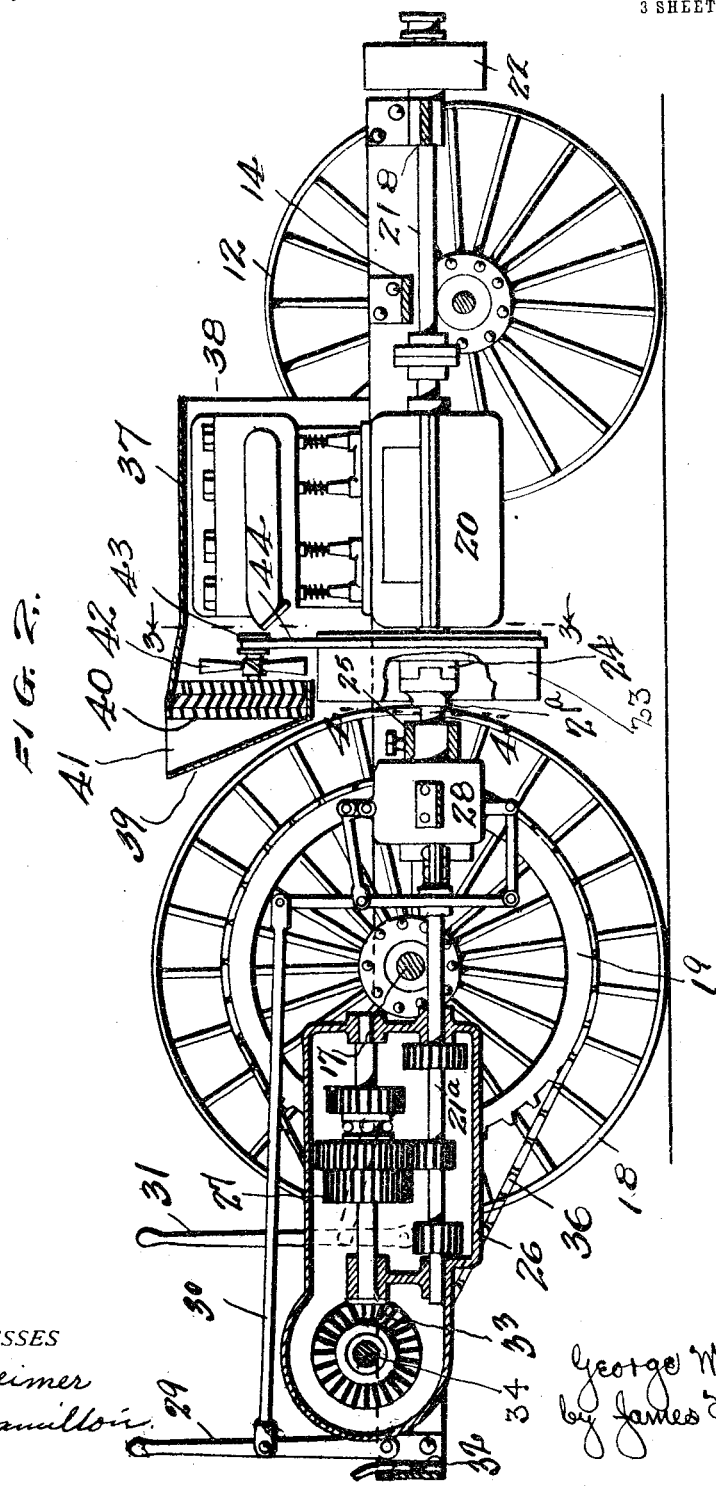

UNITED STATES PATENT OFFICE.

GEORGE W. DAY, OF GASPORT, NEW YORK.

TRACTOR.

1,126,960.   Specification of Letters Patent.   Patented Feb. 2, 1915.

Application filed February 6, 1912. Serial No. 675,848.

*To all whom it may concern:*

Be it known that I, GEORGE W. DAY, a citizen of the United States, residing at Gasport, in the county of Niagara and State of New York, have invented certain new and useful Improvements in Tractors, of which the following is a specification, reference being had to the accompanying drawings.

The primary object of the present invention is to provide a compact tractor of relatively great power that is comparatively low, making it especially useful in cultivating orchards, and the like, in that it can pass beneath low branching trees.

The preferred embodiment of the invention is illustrated in the accompanying drawings, wherein:—

Figure 1 is a plan view of the tractor, certain unnecessary details of construction being eliminated for the sake of clearness of the disclosure. Fig. 2 is a longitudinal sectional view therethrough. Fig. 3 is a cross section on the line 3—3 of Fig. 2. Fig. 4 is a detail sectional view on the line 4—4 of Fig. 2.

Similar reference numerals designate corresponding parts in all the figures of the drawings.

In the embodiment disclosed, a supporting frame is employed, having a narrow front portion 5, and a wider rear portion 6, the said frame comprising side bars 7, having their rear portions bent outwardly into angular form, to provide the said rear enlargement. These side bars are connected at their front ends by a cross bar 8, and at their rear ends by a similar cross bar 9. A pair of spaced bars 10 extend longitudinally through the enlarged portion of the frame, and are connected at their front ends with the side bars by suitable braces 11.

The front end of the frame is supported by steering wheels 12, mounted on stub axles 13, pivoted to a stationary axle 14 that is fixed by special rocker to the front end of the frame. These stub axles are connected by a link 15, having its ends pivoted to arms 16, carried by said stub axles. Any suitable means may be employed for swinging the axles, in order to turn the wheels.

Extending across the wider rear portion 6 of the frame, is an axle 17, on which are mounted tractor wheels 18 that are arranged within the frame, that is to say, are located inside or between the side bars, but outside the bars 10. Mounted upon the inner sides of these wheels 18, are sprocket wheels 19.

A motor 20, of any suitable type, is mounted on the front narrower portion of the frame, and in advance of the wheels. The motor, illustrated, is of a well known multiple cylinder type, but one or more cylinders may be employed, as desired. The said motor is connected to a power shaft 21 extending centrally and longitudinally of the frame. This shaft projects beyond the front end of the frame, where it is provided with a pulley 22, or other suitable device for transmitting motion. Arranged on the power shaft, directly in rear of the motor, is a fly wheel 23. The said fly wheel is connected to the rear portion of the power shaft 21ᵃ, by means of a suitable universal joint 24, and directly in rear of said fly wheel, the said shaft is supported in a suitable transverse bearing 25.

Located in rear of the axle 17 and disposed longitudinally of the frame, is a gear case 26, in which is arranged a suitable changeable speed gearing 27. It will be noted that this gearing and gear case is mounted on the intermediate bars 10, and extends between the tractor wheels 18. The rear portion of the power shaft 21ᵃ, is connected to this gearing, and extends below the axle 17. As a result of this arrangement the entire mechanism is located very low in the frame. Interposed between the motor and the changeable speed gearing, is a reversing gear 28 of any well known type, and operated by a suitable lever 29, having link connections 30 therewith. The changeable speed gearing is also actuated by a lever 31. Both of these levers are located on the rear of the machine and adjacent to the seat of the operator, a portion of the standard of said seat being illustrated at 32 in Fig. 2. The changeable speed gearing is connected by bevel gearing 33 with a transversely disposed driving shaft 34 arranged on the rear of the machine, and carrying sprocket wheels 35. Sprocket chains 36 extend around the wheels 35 and around the sprocket wheels 19 carried by the tractor wheels. A forwardly extending drive is thus given to said tractor wheels.

The motor 20 is inclosed in a suitable casing 37, having an open front end 38, and provided with an upwardly and forwardly extending rear end wall 39. Located in the rear portion of this casing is a suitable radiator 40 for the motor, and formed in the top of the casing, between the radiator and the upper edge of the end wall 39, is an air inlet opening 41. A pair of rotary fans 42 are mounted between the radiator and motor, and are provided with pulleys 43, around which passes a belt 44 that also extends around the fly wheel 23.

As already noted, the arrangement permits all the mechanism to be very low on the frame, so that the tractor is particularly adapted for the cultivation of orchards, and the like, inasmuch as it will pass beneath the branches of low spreading trees. This is due, to a great extent, to the provision, whereby the power shaft is disposed at or below the axis of the tractor wheel. The transmission or changeable speed gearing is compactly arranged with respect to the tractor wheels, and permits the tractor to be driven at various speeds. The particular location of the reversing gear is also important, as the machine can thus be driven in opposite directions at different speeds, and said reversing gear also performs the function of a clutch and brake, all being controlled by one lever. The projection of the power shaft in front of the machine, permits the apparatus to be used as a power plant when stationary. The arrangement and structure of the cooling means is also important, in connection with a machine of this character. It will be noted that the clear air is taken from above, driven through the radiator by the fans, and then projected across the motor. The end wall 39 constitutes an effective shield for preventing the ingress of dust or dirt from the tractor wheels.

From the foregoing, it is thought that the construction, operation, and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described by invention, what I claim as new, and desire to secure by Letters Patent, is:—

1. In a tractor, the combination with an open frame, of front and rear sets of supporting wheels, transverse axles for said wheels, an engine support in the front portion of the open frame, an engine shaft located longitudinally of the frame and extending over the front axle and beneath the rear axle, the front portion being connected to the engine and transmission gearing connected to the shaft and to the rear wheels and located in rear of the rear axle.

2. In a tractor, a supporting frame, rear tractor wheels therefor, a transverse axle for said wheels, a motor located in advance of the wheels, transmission gearing disposed in rear of the wheels and connected thereto, and a power shaft connecting the motor and gearing and extending longitudinally of the frame and beneath the axle.

3. In a tractor, a supporting frame, rear tractor wheels therefor, a transverse substantially straight axle for the wheels, a motor located in advance of the wheels, a power shaft extending longitudinally of the frame from the motor, and beneath the axle to the rear of the latter, changeable speed gearing disposed longitudinally of the frame in rear of the wheels, a transverse driving shaft actuated by the speed gearing, and forwardly extending sprocket chains connecting the driving shaft and wheels.

4. In a tractor, a supporting frame, rear tractor wheels therefor, a transverse axle for the wheels, a motor located in advance of the wheels, a horizontal power shaft extending longitudinally of the frame from the motor, beneath and to the rear of the axle, changeable speed gearing disposed longitudinally of the frame in rear of the wheels and operatively connected to the power shaft, and driving connections between the changeable speed gearing and the tractor wheels.

5. In a tractor, a supporting frame, rear tractor wheels therefor, a motor mounted on the frame in advance of the wheels, changeable speed gearing disposed longitudinally of the frame in rear of the wheels, a power connection between the motor and the changeable speed gearing extending longitudinally of the frame and including a reversing clutch interposed between the motor and changeable speed gearing.

6. In a tractor, the combination with a supporting frame, including longitudinal side bars, of spaced tractor wheels journaled between the side bars, a motor mounted on the frame in advance of the wheels, changeable speed gearing mounted on the frame in rear of the axis of the wheels and extending between the same, a longitudinally disposed power shaft connecting the motor and gearing, and forwardly extending driving connections between the changeable speed gearing and the wheels.

7. In a tractor, the combination with spaced side bars, the front portions of which are closer together than the rear portions forming a supporting frame having a front narrow portion and a rear wider portion, of spaced tractor wheels journaled on the frame between the side bars and located within the wider portion of the frame, a motor mounted on the bars in the front narrower portion of the frame, changeable speed gearing mounted on the rear wider portion of the frame in rear of and extending between the wheels, a power shaft connecting the motor and gearing, a driving shaft operated by the gearing, and forwardly extending sprocket chains connecting the power shaft and wheels.

8. In a tractor, the combination with spaced side bars having front and rear substantially parallel portions, the rear portions being spaced apart a distance greater than the front portions, forming a supporting frame having a front narrow portion and a wider rear portion, a pair of spaced longitudinal bars arranged in the wider portion between the side bars, an axle extending across the wider portion, tractor wheels mounted on the axle and arranged within the wider portion outside the said longitudinal bars and inside the side bars, a motor located on the side bars in the front narrow portion, a power shaft extending longitudinally from the motor below the axle, changeable speed gearing mounted longitudinally on the frame in rear of the axle, a transverse driving shaft geared to the changeable speed gearing, and sprocket chain connections between the driving shaft and wheels.

9. In a tractor, the combination with a supporting frame and tractor wheels, of a motor, driving connections between the motor and tractor wheels, air cooling means for the motor interposed between the wheels and motor, and a shield interposed between the wheels and the cooling means.

10. In a tractor, the combination with a supporting frame and tractor wheels, of a motor, driving connections between the motor and tractor wheels, a radiator for the motor interposed between the wheels and motor, a shield interposed between the motor and wheels, and means for creating a draft of air through the radiator and across the motor.

11. In a tractor, the combination with a supporting frame and tractor wheels, of a motor, driving connections between the motor and tractor wheels, a radiator for the motor interposed between the wheels and motor, a casing for the motor and radiator having an end wall interposed between the radiator and wheels and having an upper inlet opening adjacent said end wall, and means for creating a draft of air through the radiator and across the motor.

Signed at Gasport, Niagara county, New York, this first day of February, 1912, in the presence of the two undersigned witnesses.

GEO. W. DAY.

Witnesses:
L. L. DAVISON,
W. F. KRINKE.

Copies of this patent may be obtained for five cents each, by addressing the "Commissioner of Patents, Washington, D. C."